June 5, 1923.
H. SMITH
FISHING DEVICE
Filed Nov. 27, 1922
1,457,401
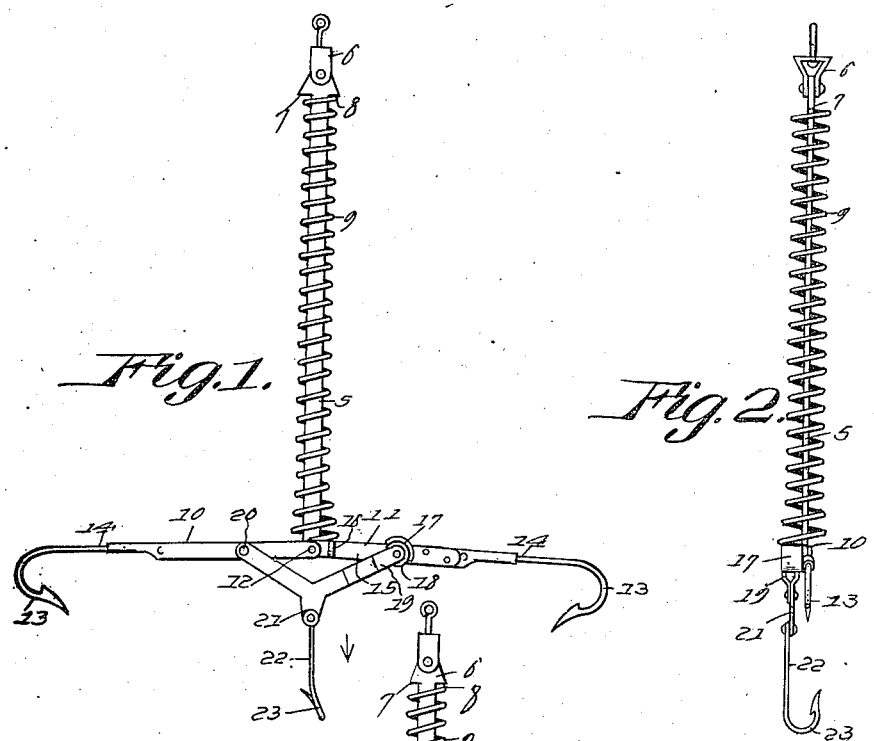
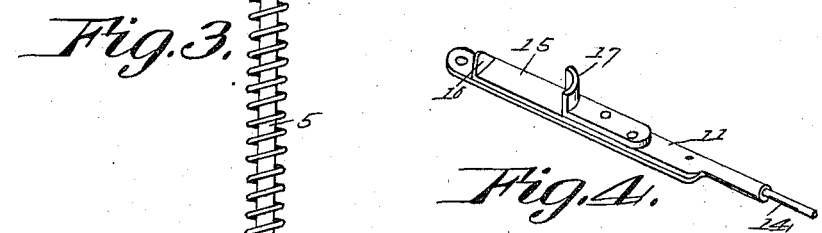
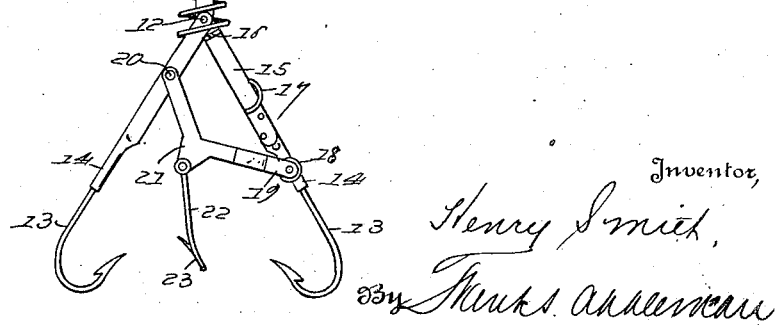
Inventor,
Henry Smith,
By
Attorney

Patented June 5, 1923.

1,457,401

UNITED STATES PATENT OFFICE.

HENRY SMITH, OF TURNERSVILLE, TEXAS.

FISHING DEVICE.

Application filed November 27, 1922. Serial No. 603,573.

*To all whom it may concern:*

Be it known that I, HENRY SMITH, a citizen of the United States of America, and resident of Turnersville, in the county of Coryell and State of Texas, have invented certain new and useful Improvements in Fishing Devices, of which the following is a specification.

This invention relates to fishing apparatus, and particularly to a device having a plurality of hooks which are mounted in coactive relation to one another; the said device having means whereby the mounting of one of the hooks operates as a trigger to hold other hooks in spaced relation to the first mentioned hook against the action of a spring, which spring is operative to force the second mentioned hooks toward each other and toward the first mentioned hook, thus causing the second mentioned hooks to impale the fish which may start the trigger and release the second mentioned hooks.

It is a further object of this invention to produce a fishing device in which the movement of the spring is limited with respect to the impaling hooks, in order that the parts may be maintained in operative relation.

It is a still further object of this invention to produce a fishing device in which the impaling hooks are pivotally mounted in order that they will swing apart from each other; and the provision of novel means by which they are held until the trigger is tripped.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a fishing device embodying the invention;

Figure 2 illustrates an edge view thereof;

Figure 3 illustrates a view in elevation showing the parts in different positions of adjustment; and Figure 4 illustrates a perspective view of one of the arms.

In these drawings, 5 denotes a rod which may be provided with a line connection 6 preferably having a swivel joint as shown, and the said rod near its outer end has shoulders 7 and 8 which constitute abutments for the end of a spring 9 which encircles the said rod and is intended to operate the arms 10 and 11 that are oscillatably connected to the inner end of the rod on the pivot 12. Each arm 10 and 11 carries a fish hook 13, the shank 14 of which is secured to the arm in any appropriate way, but in the present embodiment of the invention, the outer end of each arm is tubular and the shank of the hook fits in it, as fully shown in Fig. 4.

The arm 11 has a plate 15 secured on it, and this plate has a flange 16 at one end which contacts the coacting arm and limits the inward movement of the arms under the influence of the spring 9 which has its end bearing against the said arms. As the flange 16 prevents the arms from moving to a position parallel to each other, the spring is prevented from riding down the arms to a degree which will prevent the operation of the arms when they are to be adjusted to open positions. The plate 15 is also provided with a seat 17, here shown as being curved and this seat is intended to receive and retain a roller 18 which is rotatably mounted at the end of a trigger 19, the said trigger being oscillatably mounted on the arm 10 by the pivot 20. The trigger is shown as angular and at a point between its ends it has an ear 21 to which the shank 22 of the fish hook 23 is connected and preferably pivoted. The hook 23 is the bait hook, and when the bait is attacked by the fish, the trigger will be disturbed and the roller 18 will be disengaged from the seat 17, thus freeing the arms 10 and 11 and permitting them to be forced inwardly under the influence of the spring 9 to the positions shown in Fig. 3. As shown in Fig. 3, the inner end of the spring is but slightly below the pivot of the arms, and hence, when the arms are again moved outwardly, they will serve to force the spring outwardly to increase its tension and the parts will be held in the position shown in Fig. 1 when the trigger is re-set. The impaling hooks when forced toward the hook 23 will be imbedded in the sides of the jaw of the fish and thus the fish will be held securely while being caught.

I claim:

1. In a fishing device, a rod, a spring encircling the rod, means for holding the spring under tension, arms pivotally connected to the rod and engaged by the spring, a trigger, means for pivotally connecting the trigger to one of the arms, a socket on the other arm in which the end of the trigger is lodged for holding the arms apart, a hook connected to the trigger for dislodging the trigger and permitting the arms to swing inwardly, and hooks on the said arms.

2. In a fishing device, a rod, a spring encircling the rod, means for holding the spring under tension, arms pivotally connected to the rod, hooks carried by the said arms, means on one arm adapted to engage the other arm for limiting the movement of the arms toward each other, a trigger pivotally connected to one arm, a seat on the other arm engaged by the trigger, and a hook connected to the said trigger.

HENRY SMITH.